Oct. 17, 1944.  R. H. WHISLER, JR., ET AL  2,360,748
COMBINATION STABILIZER STRUT AND SHOCK ABSORBER
Filed Sept. 5, 1941  3 Sheets-Sheet 1
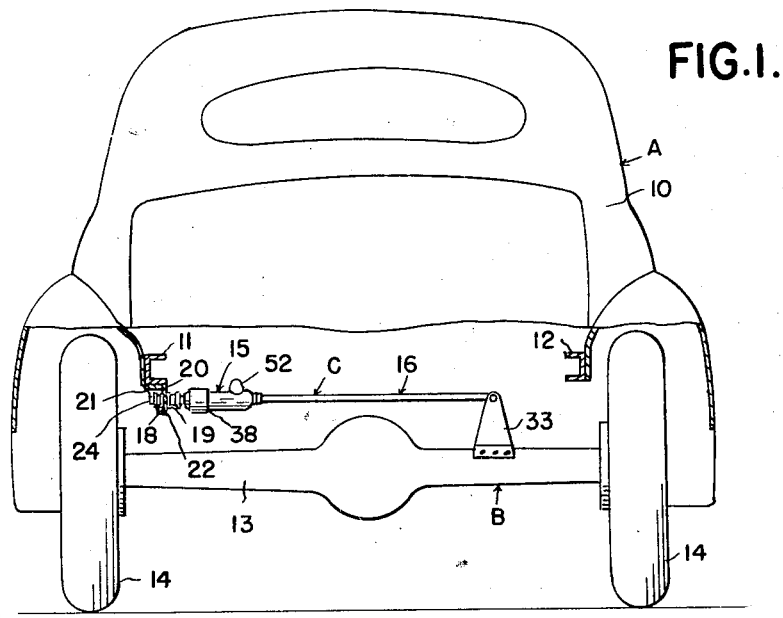
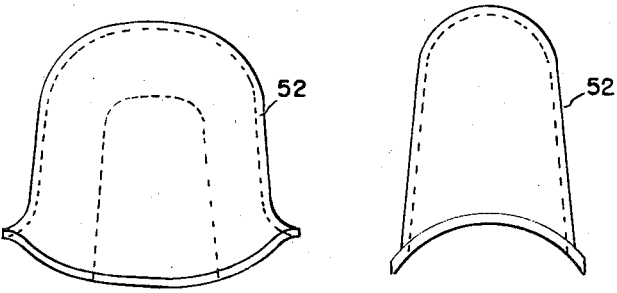
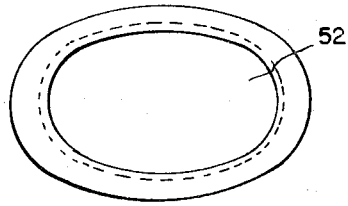
INVENTORS
RALPH H. WHISLER JR.
CHARLES E. READ
JOHN M. NICKELSEN
ARTHUR BOOR
BY
ATTORNEYS Oct. 17, 1944.   R. H. WHISLER, JR., ET AL   2,360,748
COMBINATION STABILIZER STRUT AND SHOCK ABSORBER
Filed Sept. 5, 1941   3 Sheets-Sheet 2
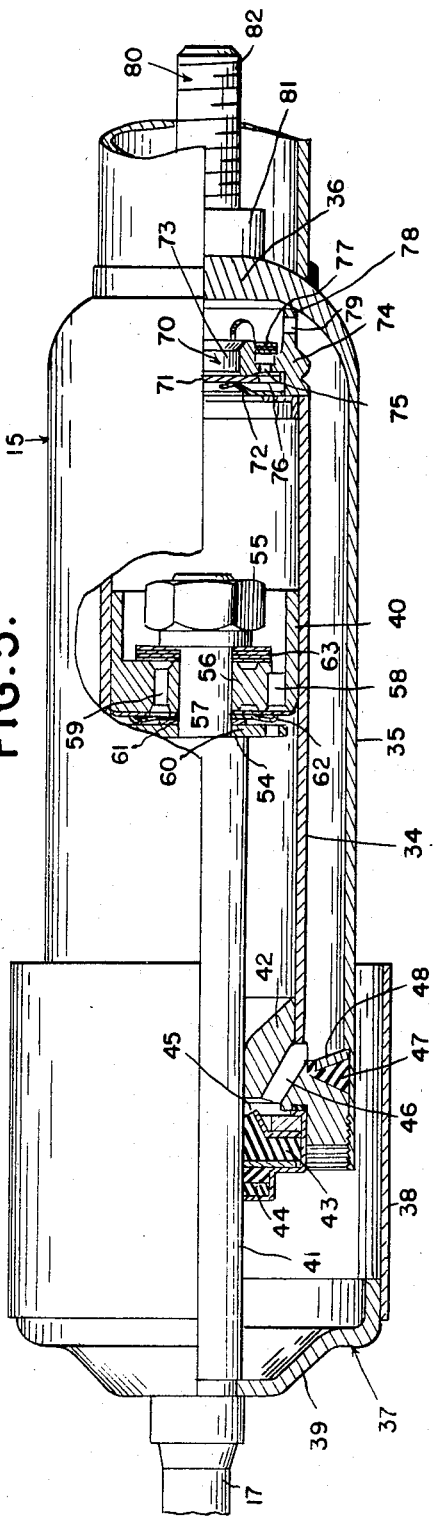
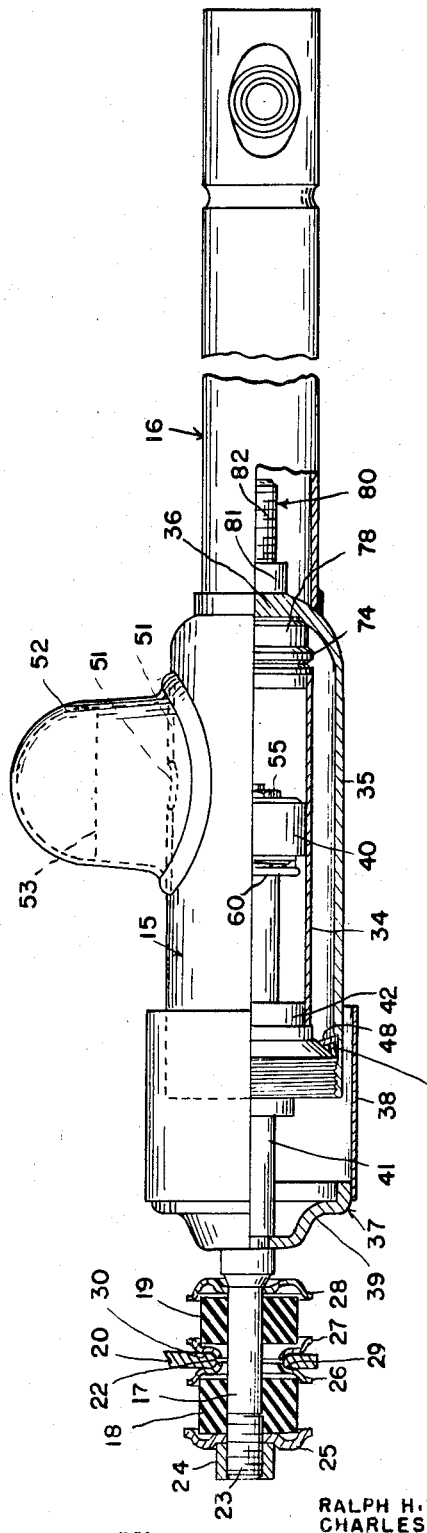
INVENTORS
RALPH H. WHISLER JR.
CHARLES E. READ
JOHN M. NICKELSEN
ARTHUR BOOR
BY
Whittemore
ATTORNEYS Oct. 17, 1944.　　　R. H. WHISLER, JR., ET AL　　　2,360,748
COMBINATION STABILIZER STRUT AND SHOCK ABSORBER
Filed Sept. 5, 1941　　　3 Sheets-Sheet 3
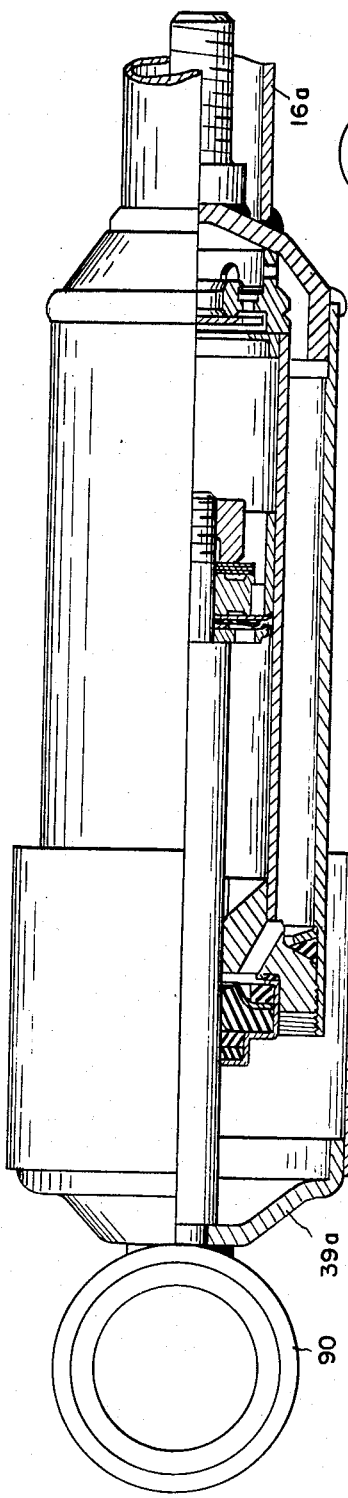
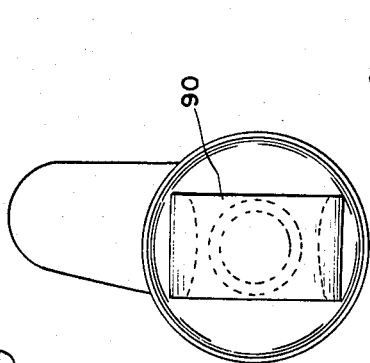
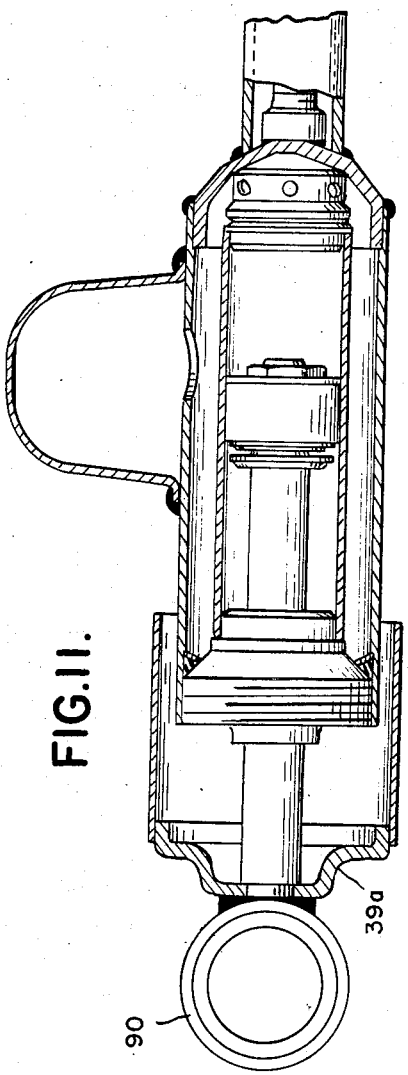
INVENTORS
RALPH H. WHISLER JR.
CHARLES E. READ
JOHN M. NICKELSEN
ARTHUR BOOR
BY
ATTORNEYS Patented Oct. 17, 1944

2,360,748

UNITED STATES PATENT OFFICE 2,360,748

COMBINATION STABILIZER STRUT AND SHOCK ABSORBER

Ralph H. Whisler, Jr., and Charles E. Read, Monroe, and John M. Nickelsen, Ann Arbor, Mich., and Arthur Boor, Toledo, Ohio, assignors to Monroe Auto Equipment Company, Monroe, Mich., a corporation of Michigan Application September 5, 1941, Serial No. 409,718

10 Claims. (Cl. 267—67)

This invention relates generally to stabilizing struts and refers more particularly to a combination strut and shock absorber capable of being installed on a motor vehicle to stabilize the action of the sprung and unsprung portions thereof.

One of the essential objects of the invention is to provide a strut of the type mentioned that includes as a part thereof a hydraulic shock absorber adapted to yieldably check side sway of the vehicle.

Another object is to provide a strong and durable combination strut and shock absorber that comprises relatively few parts, that can be manufactured at a comparatively low cost, that may be readily installed, that occupies a minimum of space in an out-of-the-way location with respect to the usual parts of the vehicle, and that is effective and efficient in operation.

Other objects, advantages and novel details of construction of this invention will be made more apparent as this description proceeds, especially when considered in connection with the accompanying drawings, wherein:

Figure 1 is a fragmentary cross sectional view through a motor vehicle, showing a combination strut and shock absorber embodying our invention applied thereto;

Figure 2 is a side elevation of the combination strut and shock absorber, with parts broken away and in section;

Figure 3 is an end view of the structure shown in Figure 2;

Figure 4 is a fragmentary longitudinal sectional view through the strut portion of the combination;

Figure 5 is an enlarged fragmentary elevation of the shock absorber portion of the combination, with parts broken away and in section;

Figures 6, 7 and 8, respectively, are detail views of the dome portion of the shock absorber;

Figure 9 is a view similar to Figure 2 but showing a slight modification;

Figure 10 is an end view of the structure illustrated in Figure 9;

Figure 11 is an enlarged fragmentary elevation of the shock absorber portion of the combination illustrated in Figure 9.

Referring now to the drawings, A is the sprung portion and B is the unsprung portion of a motor vehicle, and C is a combination strut and shock absorber embodying our invention extending transversely of the vehicle and terminally connected to said sprung and unsprung portions. As usual, the sprung portion A includes the vehicle body 10 and the supporting sills 11 and 12, respectively, therefor, while the unsprung portion includes the transversely extending axle 13 and the ground wheels 14.

The combination strut and shock absorber C is above and substantially parallel to the axle 13 and preferably has the shock absorber portion 15 and the strut portion 16 thereof in end-to-end relation so that the exterior of the combination simulates one elongated strut member.

Mounted upon an axially extending arm 17 at the shock absorber end of the combination are two rubber blocks 18 and 19, respectively, that are located upon opposite sides of a vertical web 20 of a supporting bracket 21 extending downwardly from and rigid with the sill 11. The arm 17 extends through an opening 22 in the web 20 of the bracket and is provided at its outer end with a threaded portion 23 upon which a retaining nut 24 is mounted. The rubber blocks 18 and 19 have metal end plates 25, 26, 27 and 28, respectively, encircling the arm 17, and preferably the intermediate end plates 26 and 27 have opposed substantially L-shaped portions 29 and 30, respectively, that cooperate with each other to form a saddle for the edges of the opening 22 in the web 20.

The strut portion 16 of the combination is tubular and contains at its outer end a rubber block 31 from which a stud 32 projects for connection with an upstanding bracket 33 on the axle 13. Preferably the block-stud combination just mentioned is similar to that illustrated in United States Patent No. 2,149,622, dated March 7, 1939, and therefore need not now be described in detail.

The shock absorber portion or unit 15 of the combination has a tubular pressure chamber 34, a tubular reserve chamber 35 substantially concentric with the pressure chamber 34 and having a closed inner end 36 abutting and rigidly secured to the inner end of the tubular strut portion 16, a dust shield 37 including a tube 38 substantially concentric with the reserve chamber 35 and an end plate 39 rigid with said tube and with the axially extending arm 17, a piston 40 within and movable lengthwise of the pressure chamber 34, a rod 41 terminally connected to the end plate 39 and piston 40, a guide 42 for the piston rod forming a common closure for the outer ends of the pressure chamber 34 and reserve chamber 35, a seal 43 within the outer portion of the guide 42 and frictionally engaging the piston rod 41, and a packing unit 44 encircling the piston rod 41 at the outer sides of the seal 43. Preferably the guide 42 has an annular recess or pocket 45 encircling the piston rod 41 and adapted to receive any hydraulic medium wiped off the rod by the seal 43, and has an inclined passage 46 for conducting such medium from the recess 45 to the reserve chamber 35. There is also a gasket 47 of suitable material engaging the guide 42 and reserve chamber 35 to prevent the escape of the hydraulic medium, and such gasket is held in place by a retaining washer 48.

In the present instance, it is important that the shock absorber unit 15 of the combination be as short as possible and that the reserve chamber 35 have sufficient capacity to take care of the hydraulic medium under all conditions of operation; therefore, to accomplish this the top wall 50 of the reserve chamber is preferably provided with an opening 51 for the hydraulic medium and is provided with a dome 52 that covers said opening. The dome 52 may be any shape, but has its lower edges fitting tightly against and rigidly secured to the reserve chamber 35 in spaced relation to the opening 51. The purpose of this dome 52 is to provide an oil level at sufficient height above the disk valve 71 so that the unit 15 will not take in air on the suction stroke. It is also necessary to have a certain amount of air in the unit to take care of piston rod displacement. Normally the hydraulic medium completely fills the reserve chamber 35 and is up in the dome 52 to approximately the level indicated by the line 53. Thus, the hydraulic medium may flow freely through the opening 51 to and from the dome 52 and reserve chamber 35.

The inner end of the piston rod 41 is reduced so as to provide a shoulder 54 and is provided in spaced relation to said shoulder with an adjusting nut 55. The head 56 of the piston 40 is sleeved on the reduced portion 57 of the rod between the shoulder 54 and nut 55 and has two sets 58 and 59, respectively, of longitudinally extending passages for the hydraulic medium. Also sleeved on the reduced portion 57 of the rod between the head 56 of the piston and the shoulder 54 and preferably bearing against the latter is a ported plate 60. A metal washer 61 is on the inner side of this plate while a laminated spring valve 62 is sleeved on the reduced portion 57 of the rod between the washer 61 and the head 56 of the piston for controlling the outer passages 58. Another laminated leaf spring valve 63 is sleeved upon the reduced portion 57 of the rod between the nut 55 and the head 56 of the piston to control the flow of the hydraulic medium through the inner passages 59.

At the outer end of the tubular pressure chamber 34 is a compression valve assembly 70 for controlling the flow of the hydraulic medium to and from the pressure chamber 34 and the reserve chamber 35. Preferably this assembly comprises a metal disk valve 71 normally held by a leaf spring 72 in closed position over a central passage 73 in a valve body 74 secured to the outer end of the pressure chamber 34. This valve body 74 also has a circular series of smaller passages 75 registering with slots or openings 76 in the periphery of the valve 71. The passages 75 are under the control of a laminated spring valve 77 carried on the outer side of the valve body 74. If desired, the valve body 74 may have a tubular extension 78 engaging the closed end 36 of the reserve chamber 35 and provided with openings 79 for the hydraulic medium.

80 is a bolt having its head 81 secured to the closed end 36 of the reserve chamber 35 and having its threaded shank 82 in axial alignment with the piston rod 41 and arm 17. Such bolt 80 is used to mount the shock absorber portion 15 in a test fixture (not shown) before assembling the tubular strut portion 16 therewith.

In Figures 9 to 11, inclusive, we have illustrated a slight modification wherein heads 90 and 91, respectively, rigidly secured to the cover plate 39ᵃ and the closed outer end 92 of the tubular strut portion 16ᵃ of the assembly are employed instead of the rubber mountings 18, 19 and 31, respectively, to connect the combination strut and shock absorber to the sprung and unsprung weight of a vehicle. Otherwise, the construction is similar to that illustrated in Figures 1 to 8, inclusive.

In use, the combination strut and shock absorber will yieldably check side sway of the vehicle and, therefore, will effectively stabilize the action of the sprung and unsprung portions of the vehicle. Aside from the yieldable mountings provided by the rubber blocks 18, 19 and 31, respectively, the shock absorber portion 15 of the combination will function to accomplish the desired results. For example, when either end of the combination is subjected to a pulling action tending to extend the over-all length of the combination, the piston 40 travels to the left in the pressure chamber 34 and causes the hydraulic medium in the pressure chamber to the left of the piston to flow to the right through the passages 59 in the piston and unseat the valve 63 so as to enter the space in the pressure chamber 34 to the right of the piston. On this stroke of the piston the compression valve 71 is unseated to allow the hydraulic medium in the reserve chamber 35 to flow through the opening 73 into the pressure chamber 34. However, when either end of the combination is subjected to a compressive action tending to collapse or shorten the over-all length of the combination, the piston 40 travels to the right in the pressure chamber 34 and causes the hydraulic medium in the pressure chamber to the right of the piston to flow to the left through the passages 58 in the piston and unseat the valve 62 so as to enter the space in the pressure chamber 34 to the left of the piston. On this stroke of the piston, the compression valve 77 is unseated to allow the hydraulic medium in the pressure chamber 34 to flow in a restricted manner through the openings 75 into the reserve chamber 35. Thus, the relative movement between the sprung and unsprung portion of the vehicle is yieldably checked in both directions regardless of whether the combination is subjected to a pulling or compressive action.

What we claim as our invention is:

1. A shock absorber and strut combination having an elongated shock absorber portion provided with a tubular reserve chamber for a hydraulic medium, the top wall of said chamber having an opening therein for the hydraulic medium, and a dome covering said opening and having its edges fitting tightly against and rigidly secured to said top wall of the reserve chamber in spaced relation to the edges of said opening.

2. The combination with a vehicle having two transversely spaced longitudinally extending sills and a transversely extending axle, of a downwardly projecting bracket rigidly secured to one of said sills adjacent the axle, and an upstanding bracket rigidly secured to the axle adjacent the other sill, the upper end of the upstanding bracket being substantially in horizontal alignment with the lower end of the downwardly projecting bracket, and a strut and shock absorber combination extending transversely of the vehicle between and terminally connected to the horizontally aligned ends of said brackets, said combination including a shock absorber unit and a rigid strut arranged in end to end relation and rigidly connected together.

3. The combination with a vehicle having two transversely spaced longitudinally extending sills and a transversely extending axle, of a downwardly projecting bracket rigidly secured to one of said sills adjacent the axle, and an upstanding bracket rigidly secured to the axle adjacent the other sill, the upper end of the upstanding bracket being substantially in horizontal alignment with the lower end of the downwardly projecting bracket, and a strut and shock absorber combination substantially parallel to the axle and including a hydraulic shock absorber having relatively movable parts, and an elongated strut arranged in end to end relation with and connected to one of said parts, the other of said parts and the strut being connected at their remote ends to the horizontally aligned ends of said brackets.

4. In a shock absorber and strut combination, a hydraulic shock absorber having a substantially horizontal tubular pressure chamber, a tubular reserve chamber enveloping the pressure chamber, valve means carried by the pressure chamber within the reserve chamber and controlling the flow of hydraulic medium between said chambers, the top wall of the reserve chamber being provided intermediate its ends with an aperture for hydraulic medium, and means for normally maintaining the level of hydraulic medium above the valve means in the reserve chamber so that such means will normally be submerged in such hydraulic medium, including a separate dome for hydraulic medium secured to the top wall of the reserve chamber about and in open communication with said aperture.

5. In a shock absorber and strut combination, a hydraulic shock absorber having substantially horizontal concentric tubular pressure and reserve chambers, the pressure chamber being within the reserve chamber, valve means carried by the pressure chamber within the reserve chamber and controlling the flow of hydraulic medium between said chambers, the top wall of the reserve chamber being provided intermediate its ends with an aperture for hydraulic medium, and means carried by the reserve chamber for normally maintaining the level of hydraulic medium above the valve means in the reserve chamber so that such means will normally be submerged in such hydraulic medium, including a separate dome for hydraulic medium secured to the top wall of the reserve chamber in open communication with said aperture.

6. The combination with a vehicle having sprung and unsprung portions, the sprung portion including supporting sills for a body, the unsprung portion including a transversely extending axle, of oppositely extending brackets secured to said axle and to one of said sills and having free ends disposed substantially in horizontal alignment, and means for yieldably stabilizing the action of the sprung and unsprung portions including a hydraulic shock absorber and strut combination extending transversely of the vehicle above and substantially parallel to said axle, the shock absorber having relatively movable tubular sections and valve means controlling the flow of hydraulic medium between said sections, one of said sections being connected to the free end of one of said brackets, the strut being an endwise extension of and rigid with the other of said sections and being connected to the free end of the other of said brackets.

7. The combination with a vehicle having sprung and unsprung portions, the sprung portion including supporting sills for a body, the unsprung portion including a transversely extending axle, of oppositely extending brackets secured to said axle and to one of said sills and having free ends disposed substantially in horizontal alignment, and means for yieldably stabilizing the action of the sprung and unsprung portions including a hydraulic shock absorber and a rigid strut arranged end to end and extending transversely of the vehicle in substantially parallel relation to said axle, the hydraulic shock absorber having relatively movable tubular sections and valve means controlling the flow of hydraulic medium between said sections, one of said sections being connected to the free end of one of said brackets, the strut being rigid with the other of said sections and being connected to the free end of the other of said brackets.

8. The combination with a vehicle having sprung and unsprung portions, of oppositely extending brackets secured to said sprung and unsprung portions and having free ends disposed substantially in horizontal alignment, and means for yieldably stabilizing the action of the sprung and unsprung portions including a hydraulic shock absorber and a rigid strut arranged end to end and extending transversely of the vehicle, the shock absorber having relatively movable tubular sections and valve means controlling the flow of hydraulic medium between said sections, one of said sections being connected to the free end of one of said brackets, the strut being an endwise extension of and rigid with the other of said sections and being connected to the free end of the other of said brackets.

9. In a shock absorber and strut combination, a hydraulic shock absorber having a substantially horizontal elongated pressure chamber, a tubular reserve chamber enveloping and substantially concentric with the pressure chamber, valve means within the reserve chamber at one end of the pressure chamber controlling the flow of hydraulic medium between said chambers, the top wall of said reserve chamber being provided intermediate its ends with an aperture for hydraulic medium, and a separate dome secured to the reserve chamber over said aperture so as to receive hydraulic medium therefrom, said dome, reserve chamber, and aperture being so constructed and arranged relative to each other that the volume of hydraulic medium in the reserve chamber is normally sufficient to completely envelop the valve means.

10. In a shock absorber and strut combination, an elongated hydraulic shock absorber having a substantially horizontal pressure cylinder, a tubular reserve chamber for a hydraulic medium enveloping and substantially concentric with the pressure cylinder, valve means controlling the flow of hydraulic medium between the cylinder and chamber, the top wall of said chamber having an aperture for hydraulic medium, and a dome for hydraulic medium covering and in open communication with said aperture, said dome being secured to the top wall of said reserve chamber around the edges of said aperture.

RALPH H. WHISLER, Jr.
CHARLES E. READ.
JOHN M. NICKELSEN.
ARTHUR BOOR.